United States Patent
Puishys, Jr. et al.

(10) Patent No.: US 7,962,692 B2
(45) Date of Patent: Jun. 14, 2011

(54) METHOD AND SYSTEM FOR MANAGING PERFORMANCE DATA

(75) Inventors: Robert E. Puishys, Jr., Oxford, MA (US); Daniel E. Butterworth, Peyton, CO (US); Paul N. Williams, Littleton, CO (US); Wayne C. Sauer, Golden, CO (US)

(73) Assignee: Computer Associates Think, Inc., Islandia, NY (US)

( * ) Notice: Subject to any disclaimer, the term of this patent is extended or adjusted under 35 U.S.C. 154(b) by 1287 days.

(21) Appl. No.: 11/538,871

(22) Filed: Oct. 5, 2006

(65) Prior Publication Data

US 2009/0157923 A1  Jun. 18, 2009

(51) Int. Cl.
*G06F 12/00* (2006.01)

(52) U.S. Cl. .............................. 711/118; 711/E12.038

(58) Field of Classification Search .................. 711/118
See application file for complete search history.

(56) References Cited

U.S. PATENT DOCUMENTS 5,062,055 A    10/1991  Chinnaswamy et al.
7,505,886 B1 *  3/2009  Alvarez et al. .................. 703/14

* cited by examiner

*Primary Examiner* — Reginald G Bragdon
*Assistant Examiner* — Hamdy S Ahmed
(74) *Attorney, Agent, or Firm* — Baker Botts L.L.P.

(57) ABSTRACT

The present invention is directed to a method and system for managing performance data. In accordance with a particular embodiment of the present invention, cache metrics are received. At least one of the cache metrics may be compared with a threshold value. A determination may be made as to whether one or more parameter adjustments are required based upon the comparison.

17 Claims, 4 Drawing Sheets

416

| CACHE HITS | CACHE READS | CACHE WRITES | CACHE FREE | PAGES FREE | FREE GOAL | TIME OF OCCURRENCE |
|---|---|---|---|---|---|---|
| 0 | 0 | 0 | 0 | 50 | 80 | 10.12.2006 12:21:40 |
| 5 | 2 | 3 | 80.1 | 53 | 80 | 10.12.2006 12:23:40 |
| 10 | 3 | 3 | 78.1 | 23 | 80 | 10.12.2006 12:27:40 |
| ⋮ | ⋮ | ⋮ | ⋮ | ⋮ | ⋮ | ⋮ |
|  |  |  |  |  |  | 10.12.2006 17:32:20 |
|  |  |  |  |  |  |  |

| CACHE HITS | READ ATEMPTS | CACHE WRITES | CACHE FREE | TIME OF OCCURRENCE |
|---|---|---|---|---|
| 0 | 0 | 0 | 0 | 10.12.2006 12:21:40 |
| 5 | 2 | 3 | 80.1 | 10.12.2006 12:23:40 |
| 10 | 3 | 3 | 78.1 | 10.12.2006 12:27:40 |
| ⋮ | ⋮ | ⋮ | ⋮ | ⋮ |
|  |  |  |  | 10.12.2006 17:32:20 |
|  |  |  |  |  |

| CACHE HITS | CACHE READS | CACHE WRITES | CACHE FREE | PAGES FREE | FREE GOAL | TIME OF OCCURRENCE |
|---|---|---|---|---|---|---|
| 0 | 0 | 0 | 0 | 50 | 80 | 10.12.2006 12:21:40 |
| 5 | 2 | 3 | 80.1 | 53 | 80 | 10.12.2006 12:23:40 |
| 10 | 3 | 3 | 78.1 | 23 | 80 | 10.12.2006 12:27:40 |
| ⋮ | ⋮ | ⋮ | ⋮ | ⋮ | ⋮ | ⋮ |
|  |  |  |  |  |  | 10.12.2006 17:32:20 |
|  |  |  |  |  |  |  |

| CACHE HITS/ SEC | CACHE READS/ SEC | CACHE WRITES/ SEC | CACHE MISSES 33-64 BLOCKS | CACHE MISSES 65-127 BLOCKS | CACHE MISSES 128-255 BLOCKS | CACHE MISSES GT 255 BLOCKS | TIME OF OCCURRENCE |
|---|---|---|---|---|---|---|---|
| 0 | 0 | 0 | 1 | 1 | 1 | 1 | 10.12.2006 12:21:40 |
| 10 | 2 | 3 | 1 | 2 | 1 | 1 | 10.12.2006 12:21:40 |
| 20 | 3 | 3 | 3 | 3 | 4 | 4 | 10.12.2006 12:21:40 |
| ⋮ | ⋮ | ⋮ | ⋮ | ⋮ | ⋮ | ⋮ | ⋮ |
|  |  |  |  |  |  |  | 10.12.2006 17:32:20 |
|  |  |  |  |  |  |  |  |

US 7,962,692 B2

METHOD AND SYSTEM FOR MANAGING PERFORMANCE DATA

TECHNICAL FIELD

The present disclosure relates generally to performance analysis, and more particularly to a method and system for managing performance data.

BACKGROUND OF THE INVENTION

Conventional operating systems often exercise control over data processing systems by adjusting certain parameters. Parameters may refer to system values that can be set either by the operating system or by a user. For example, a parameter may be a maximum working storage size allotted to each process, priority of a process, size of cache memory, size of common area of memory, or any other system value. The operating system may configure certain parameters based on performance data described in metrics. Metrics may refer to measured performance data values, such as an amount of available memory.

It is often desirable to execute performance analysis on certain metrics. Performance analysis may include analyzing certain metrics to determine whether a particular operating system is performing efficiently. Performance analysis may also include configuring certain parameters to increase efficiency. For example, it may be necessary to analyze certain work load characteristics such as the amount of paging, swapping, and available memory to determine if a parameter may be configured to adapt to different work loads.

Performance analysis often is made according to the subjective standards of particular engineers performing the analysis. This approach is often problematic because different engineers may interpret metrics differently. Thus, different engineers presented with the same metrics may have different opinions of, for example, whether there is sufficient available memory.

Further, management of performance data for performance data analysis is a complex task because performance data may originate from clustered networks with multiple servers, numerous software components, and computing devices. For example, even after determining from metrics that there is a critical lack of available memory, the cause of the lack of available memory must be identified before a parameter may be adjusted.

SUMMARY OF THE INVENTION

The present invention is related to a system and method for managing performance data, and executing performance analysis that identifies parameters that may be adjusted to increase efficiency. The teachings of the present invention also allow a user to proactively monitor operating system performance to identify potential problems before they can negatively impact a system.

In accordance with a particular embodiment of the present invention, a method for managing performance data includes receiving cache metrics. The method also includes comparing at least one of the cache metrics with a threshold value. The method further includes determining whether one or more parameter adjustments are required based upon the comparison.

Technical advantages of particular embodiments of the present invention include a system and method for managing performance data that measures performance data to execute a performance analysis of an operating system. Thus, potential problems and recommended actions may be identified and reported to a user.

Further technical advantages of particular embodiments of the present invention include a system and method for managing performance data that periodically collects performance data in the form of metrics, and analyzes the metrics according to predetermined rules to recommend actions to be taken according to those rules.

Further technical advantages of particular embodiments of the present invention include a system and method for managing performance data that explains the actions which have been recommended and supplies the evidence forming the basis of the recommendations. Accordingly, a user may be provided with a knowledge-base of performance tuning advice.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1A:
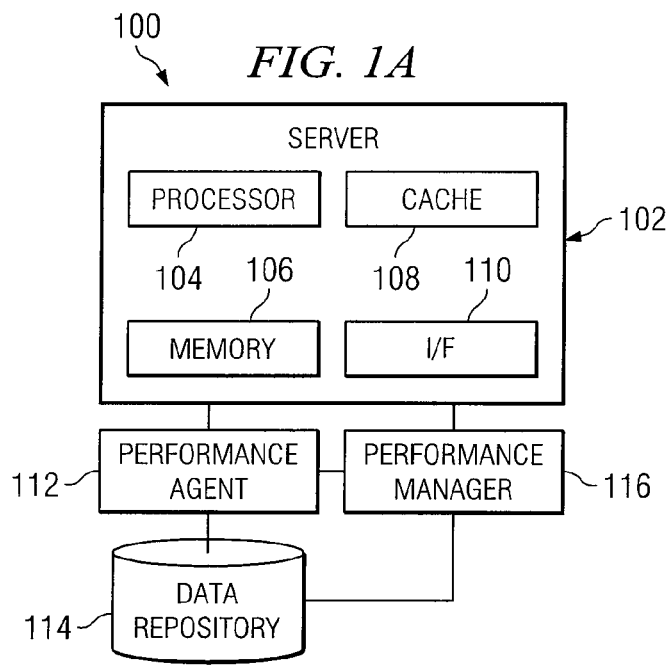
FIG. 1A is a block diagram illustrating a system for managing performance data according to the teachings of the present invention.

With the ever changing demand for IT resources, performance management is a key area for enterprise systems. Organizations may increase their utilization of hardware, software, and other components with performance management. This entails the ability to collect and analyze performance data across the infrastructure. This collecting and analyzing enables organizations to utilize their IT resources efficiently by adjusting certain parameters.

Many operating systems have built-in programs for making operational measurements of performance data for a processor and its operating system. Such performance data may include working storage sizes, certain queue lengths, and number of input and output operations (I/O's), as an example. However, even with the proper information, it is still difficult to assess operating system efficiency with accuracy, and to make proper recommendations for configuration changes. For example, even after determining from the measured data that there is a critical lack of available memory, the cause of the lack of memory must be identified before helpful suggestions can be offered.

Another limitation of conventional monitoring systems is that the analysis called for often depends upon the individual judgments of the engineers performing the analysis. Thus, different engineers presented with the same set of facts may have different opinions of the cause and solution for a particular issue. Variation in the results of operating system analyses by different engineers may occur for several reasons. First, it may not be clear what the different measurements represent. In addition, different engineers may interpret the measurements differently. Further, since each engineer may operate differently, results of their analyses are often inconsistent.

In accordance with the teachings of the present invention, performance data is periodically collected from a data processing system or network of such systems. For example, the value of each of several metrics (each of which represents a measurable quantity in the data processor system) may be measured at least once during predetermined time periods. Such metrics may include a measurement of the available memory, as an example.

In accordance with a particular embodiment of the present invention, rules are applied to the metrics to determine whether the rules are triggered. A rule may identify a threshold for metrics, and may specify relationships between each of the metrics and the corresponding thresholds which are required to meet each rule. For example, a rule may identify a particular percentage of available memory as a threshold before a rule is triggered.

In accordance with a particular embodiment of the present invention, certain suggested actions may be provided when the rules have been triggered a sufficient number of times. For example, by recording the rules which have triggered and the intervals during which each of the rules has triggered, suggestions may be made as to certain parameters that may be configured to reduce potential performance issues, such as increasing the amount of system memory.

The method and system for managing performance data identified in this invention are not limited to any specific data processing system. The examples illustrated in the accompanying figures will be described with reference to a network of Itanium 2® based Hewlett Packard Integrity®. The servers are assumed to be using an OpenVMS I64 operating system. However, other well-known OpenVMS, OpenVMS VAX, OpenVMS Alpha, or other appropriate operating systems, including future operating systems may be used. Additional information regarding performance analysis for OpenVMS data processing systems is available within U.S. Pat. No. 5,062,055 (the "'055 patent").

FIG. 1A is a block diagram illustrating a system 100 for managing performance data according to the teachings of the present invention. As shown in FIG. 1A, system 100 generally includes a server 102, a performance agent 112, a data repository 114, and a performance manager 116. System 100 is particularly adapted for collecting and analyzing performance data for server 102.

Server 102 may refer to any suitable device operable to process data. Examples of server 102 may include a host computer, workstation, web server, file server, a personal computer such as a laptop, or any other device operable to process data. Although the present invention is discussed with reference to OpenVMS I64, server 102 may execute with any of the other well-known MS-DOS, PC-DOS, OS-2, MAC-OS, WINDOWS™, UNIX, OpenVMS, OpenVMS VAX, OpenVMS Alpha, or other appropriate operating systems, including future operating systems.

According to the illustrated embodiment of the invention, server 102 includes a processor 104, a memory device 106, a cache 108, and a communication interface (I/F) 110.

Processor 104 may refer to any suitable device operable to execute instructions and manipulate data to perform operations for server 102. Processor 104 may include, for example, any type of central processing unit (CPU).

Memory device 106 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Cache 108 may refer to any suitable device operable to store data duplicating original values stored elsewhere. For example, cache 108 may be searched each time processor 104 requests data from memory device 106. As another example, cache 108 may be searched each time processor 104 requests data from a storage device, such as a disk. Successful searches may result in the requested data being retrieved from cache 108. Unsuccessful searches may result in the requested data being retrieved directly from memory device 106. According to particular embodiments of the present invention, cache 108 may be implemented as an Extended File Cache (XFC) provided in OpenVMS I64 and OpenVMS Alpha. XFC is a file-system data cache that offers several features, such as read-ahead caching and automatic resizing of the cache to improve performance.

According to one embodiment of the invention, when a cache client, processor 104 for example, wishes to access data presumably in memory device 106, the client may first check cache 108 for the data. Checking for data in cache 108 may be referred to as a cache attempt. If an entry is found matching the desired data in cache 108, the data in cache 108 may be used and read from cache 108 using a cache read I/O operation. Finding desired data in cache 108 may be referred to as a cache hit. For example, processor 104 may check cache 108 with a cache attempt to see if it has a copy of the contents of a particular file at a particular address. If the contents exist in cache 108, the result is a cache hit. The percentage of cache attempts that result in cache hits may be referred to as a hit rate percentage or a hit ratio percentage. A cache miss may refer to the situation where cache 108 is checked but does not contain the desired data. In the event of a cache miss, the data may be fetched from memory device 106 and written into cache 108 for the next access. Writing data to cache 108 may be referred to as a cache write I/O operation.

I/F 110 may refer to any suitable device operable to receive input for server 102, send output from server 102, perform suitable processing of the input or output or both, communicate to other devices, or any combination of the preceding. I/F 110 may include appropriate hardware (e.g. modem, network interface card, etc.) and software, including protocol conversion and data processing capabilities, to communicate through a LAN, WAN, or other communication system that allows server 102 to communicate to other devices. I/F 110 may include one or more ports, conversion software, or both.

Performance agent 112 may refer to any suitable logic embodied in computer-readable media, and when executed, that is operable to perform various functions including collecting performance data from server 102. In various embodiments, performance agent 112 may include various modules or components operable to collect performance data from server 102, such as a "data collector" component. In various embodiments, performance agent 112 may be referred to as "agent" or "data collector." The data collected by performance agent 112 may include measurable processes, processor, and network statistics, also referred to as metrics, as well as some current parameter settings. For example, performance agent 112 may collect data indicating I/O sizes, CPU utilization, and cache reads, for example. In particular embodiments of the present invention, performance agent 112 may collect performance data in certain time periods. For example, performance agent 112 may collect performance data from server 102 in two minute intervals. The metrics and parameters collected by performance agent 112 may be stored in data repository 114.

Data repository 114 may refer to any suitable device operable to store performance data, and facilitate addition, modification, and retrieval of such data. In accordance with a particular embodiment of the present invention, data repository 114 may utilize a record management system to store data. This provides data repository 114 with ease of data access, a high degree of reliability, availability, scalability, good performance and cluster support. In other embodiments, data repository 114 may utilize other data management systems, such as a relational database management system to store data, making data available and accessible through a language such as Structured Query Language (SQL).

Performance manager 116 may refer to any suitable logic embodied in computer-readable media, and when executed, that is operable to compare thresholds to the metrics and parameters in data repository 114 and determine whether particular rules have been triggered. Based on those rules, performance manager 116 may reach certain conclusions about the performance of server 102. Preferably, such conclusions are reached only after particular rules have been triggered more than a certain number of times in an analysis session.

Performance manager 116 may be further operable to provide a user a detailed analysis in the form of messages often containing recommendations. According to one embodiment of the invention, performance manager 116 may display the evidence for the recommendations. Such evidence may be provided the form of a statement of the rule accompanied by the parameters, thresholds, and metrics which were used to determine that the rule is met. Additional details of example embodiments of performance manager 116 are described in greater detail below in conjunction with portions of FIG. 1B.

Figure 1B:
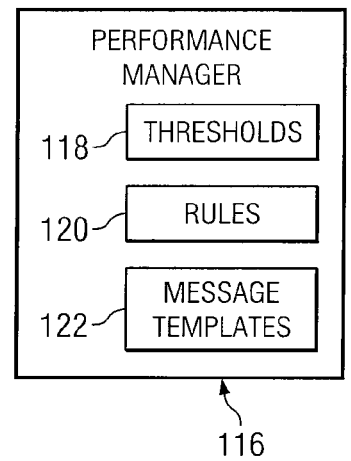
FIG. 1B is a block diagram illustrating an example performance manager of the system of FIG. 1A in accordance with an embodiment of the present invention.

FIG. 1B is a block diagram illustrating an example performance manager 116 of system 100 of FIG. 1A in accordance with an embodiment of the present invention. Performance manager 116 may include various modules operable to perform various functions, including a thresholds module 118, a rules module 120, and a message templates module 122.

In general, performance manager 116 may perform analysis by applying certain rules, stored in rules module 120, to the metrics and parameters collected during the data collection operation in data repository 114. A rule may refer to the comparison of metrics and parameters to certain thresholds, stored in thresholds module 118, to see whether the criteria of the rule (e.g., greater than, less than, etc.) have been satisfied. If all the criteria for a rule have been satisfied, then the rule is said to trigger. When a rule triggers more than a predetermined number of times, then a recommendation, included as part of a message, stored in message template module 122, is made in accordance with the rule. That recommendation generally involves suggestions to the user that adjustment of some parameter or a change in system configuration could be made to improve system performance.

For example, a rule stored in rules module 120 may examine a data cell in the form of a particular type of parameter, such as a system generation parameter, for loadable images. A system generation parameter, also referred to as a SYSGEN parameter, may refer to any parameter that indicates system settings. In the example, the rule may be designed to detect the situation where an operating system, such as OpenVMS Alpha, has not released unused memory back to the free page list that was reserved for the use of executive loadable images, identified by the SYSGEN parameter LOAD_SYS_IMAGES. The rule may first determine whether the system is an Alpha architecture based system. If the system is an Alpha architecture based system, the rule may examine the SYSGEN parameter LOAD_SYS_IMAGES to determine if it is less than 4 in the last parameters record read from a sample being analyzed. If the determination is that the SYSGEN parameter LOAD_SYS_IMAGES is less than 4, the rule may be triggered. The message template stored in message template module 122 for the rule may then printed out along with the SYSGEN parameter LOAD_SYS_IMAGES.

As another example, a rule stored in rules module 120 may examine a data cell in the form of a SYSGEN parameter that affects how threads within a multi-threaded application are created and scheduled. In the example, the rule may be designed to detect the situation where the scheduling of threads within processes running multi-threaded applications is hampered by not being allowed to use all available CPUs. The rule may first determine whether the version of the operating system is greater than or equal to a particular version, such as OpenVMS 7.3-2. If the version is greater than or equal to the particular version, the rule may examine the SYSGEN parameter MULTITHREAD to determine if it is less than the number of currently active CPUs in the last parameter and configuration records read from the sample being analyzed. If the determination is that the SYSGEN parameter MULTITHREAD is less than the number of currently active CPUs in the last parameter and configuration records read from the sample being analyzed, the rule may be triggered. The message template stored in message template module 122 for the rule may then printed out along with the SYSGEN parameter MULTITHREAD and the active CPU count.

Figure 2A:
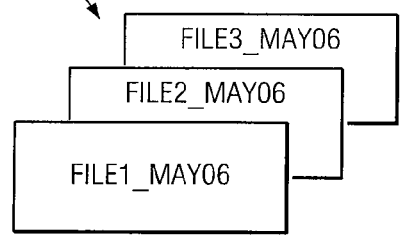
FIG. 2A is a block diagram illustrating example performance data files suitable for use in accordance with the teachings of the present invention.
Figure 2B:
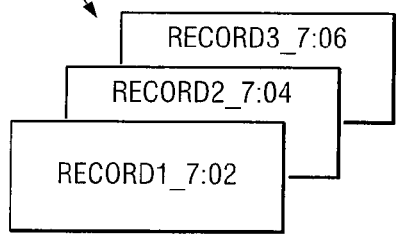
FIG. 2B is a block diagram illustrating example performance data records suitable for use in accordance with the teachings of the present invention.
Figure 2C:
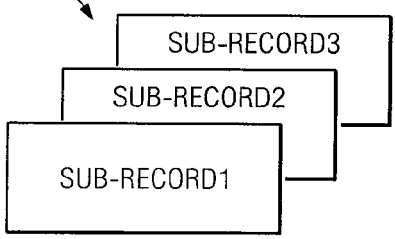
FIG. 2C is a block diagram illustrating example performance data sub-records suitable for use in accordance with the teachings of the present invention.

FIG. 2A is a block diagram illustrating example performance data files 202 suitable for use in accordance with the teachings of the present invention. Files 202 may be stored in any suitable data repository, such as data repository 114 of FIG. 1A. As shown in FIG. 2A, files 202 include an identification of the file for which the measurements pertain and the date at which the measurements were made. Files 202 may contain records each with certain time periods of measurement. FIG. 2B is a block diagram illustrating example performance data records 204 suitable for use in accordance with the teachings of the present invention. As shown in FIG. 2B, records 204 may indicate a time frequency with which measurements are taken. For records 204, the time frequency is represented as two-minute intervals. Other suitable time periods may also be used. Each of records 204 may contain sub-records. FIG. 2C is a block diagram illustrating example performance data sub-records 206 suitable for use in accordance with the teachings of the present invention. Sub-records 206 may include time stamp sub-records, such as the time of a measurement, performance sub-records, such as performance metrics, and parameter sub-records, such as parameter values. The metrics and parameters that are measured and adjusted are not separately described since those parameters and metrics are unique to each particular system. Instead, particular metrics and parameters are described in the following figures as part of the explanation of example rule analysis of the present invention.

Figures 3A, 3B:
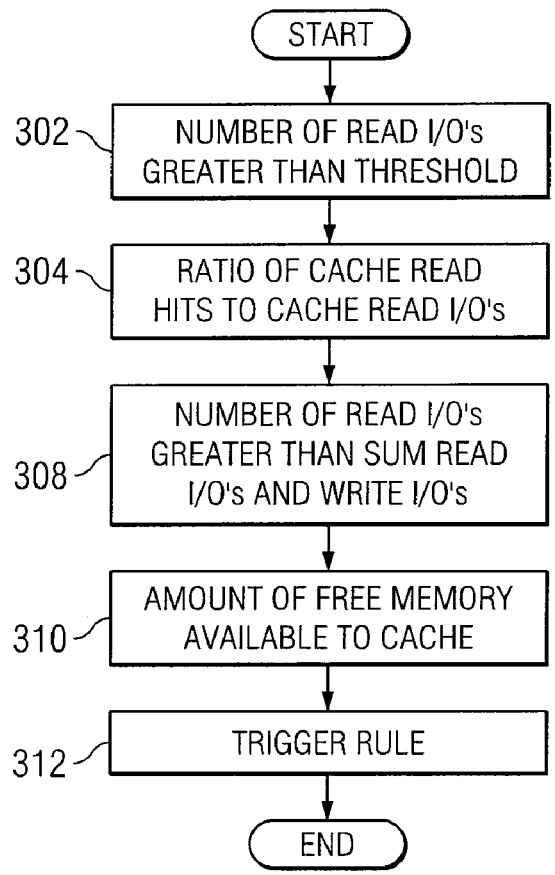
FIG. 3A is a flow diagram illustrating a method for managing performance data, according to an embodiment of the present invention.
FIG. 3B is an example of assorted performance data metrics that may be displayed for performance analysis, according to an embodiment of the present invention.

FIG. 3A is a flow diagram illustrating a method for managing performance data, according to an embodiment of the present invention. The analysis performed by the rule in FIG. 3A is designed to detect the situation where a cache, such as cache 108, is not being used effectively due to the fact that there is a relatively poor cache hit rate with a reasonably large attempt rate.

The test for effective cache usage begins at step 302 with a determination of whether the number of read I/O's is greater than the threshold named TD_XFC_ATTEMPT. TD_XFC_ATTEMPT may refer to a predetermined value of a particular number of cache attempts, for example 10. If the file cache hit rate is too low, or the missed I/O rate is too high, then step 304 is reached in which the ratio of cache read hits to cache read I/O's expressed as a percentage is compared to a threshold defined by TD_XFC_CACHE_HIT_RATE. TD_XFC_CACHE_HIT_RATE may refer to a particular percentage, such as 90 percent, of the total cache misses to the total cache hits. If the total cache hit rate is too low, then step 308 is reached in which the number of read I/O's is identified to determine if it is greater than a particular percent, such as 70 percent, of the sum of read I/O's and write I/O's. If it is greater than 70 percent for example, the amount of available memory for the cache is identified at step 310 to determine if it is greater than 0.

If the determination at step 310 is that available memory for the cache is equal to 0, the rule is triggered at step 312. The message template for the rule may then printed out along with information about the number of cache hits, read attempts, cache writes, available cache memory, and time as shown in display output 314 in FIG. 3B. The message template may indicate that a XFC cache hit rate is low with a reasonably large attempt rate. The message template may further indicate that there is cache available memory, so the cause of the low hit rate is probably due to poor hit rates on files. The message template may further indicate that this is typically due to random access to records/blocks in large files. The suggestion in the message template may suggest disabling caching on a particular file to improve system performance, as an example.

Figures 4A, 4B:
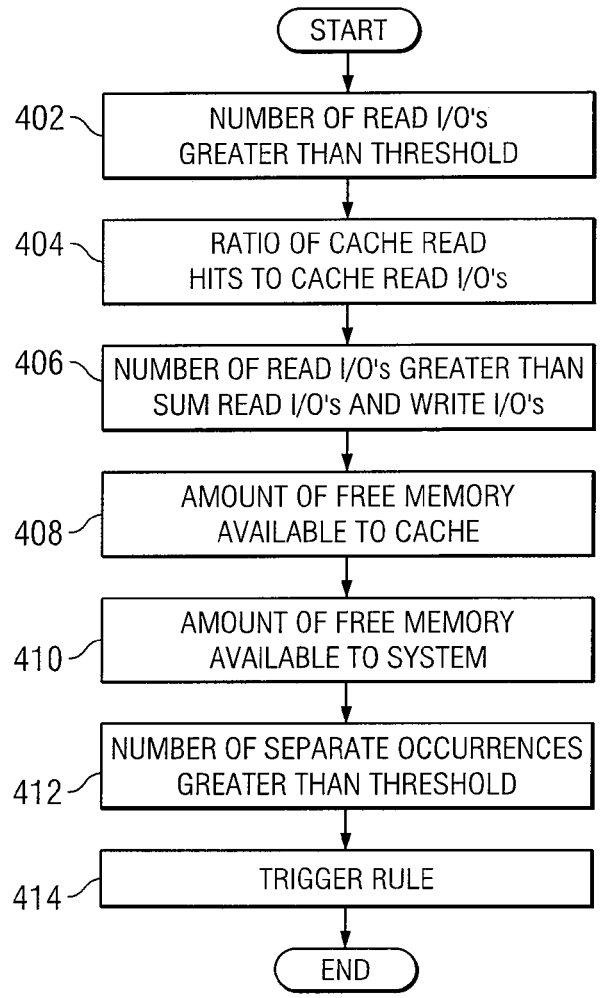
FIG. 4A is a flow diagram illustrating a method for managing performance data, according to an embodiment of the present invention.
FIG. 4B is an example of assorted performance data metrics that may be displayed for performance analysis, according to an embodiment of the present invention.

FIG. 4A is a flow diagram illustrating a method for managing performance data, according to an embodiment of the present invention. The analysis performed by the rule in FIG. 4A is designed to detect the situation where a cache, such as cache 108, has utilized all of the memory allocated to it, yet there is sufficient memory available within the system that could be used by the cache if it were allowed to expand. Cache performance could be boosted by tuning of the SYSGEN parameters. The SYSGEN parameters may refer to configuration values that control expansion.

The test for cache memory usage begins at step 402 with a determination of whether the number of read I/O's is greater than the threshold named TD_XFC_ATTEMPT. If the file cache hit rate is too low, or the missed I/O rate is too high, then step 404 is reached in which the ratio of cache read hits to cache read I/O's expressed as a percentage is compared to a threshold defined by TD_XFC_CACHE_HIT_RATE. If the total cache hit rate is too low, then step 406 is reached in which the number of read I/O's is identified to determine if it is greater than a particular percent, such as 70 percent, of the sum of read I/O's and write I/O's. If it is greater than 70 percent for example, the amount of available memory for the cache is identified at step 410 to determine if it is greater than 0. If the determination at step 408 is that the available memory for the cache is equal to 0, the amount of available memory within the system is examined at step 410 to determine if it is greater than or equal to five times the value of SYSGEN parameter FREEGOAL. FREEGOAL may refer to the limits for the number of pages of memory. The parameter represents the amount of available memory, and if it is less than the desired goal for available memory, then the determination is that available memory is scarce. If the amount of available memory available within the system is greater than or equal to five times the value of SYSGEN parameter FREEGOAL, the number of separate occurrences of all of the above conditions is examined at step 412 to determine if they are greater than or equal to a threshold value defined by TD_IO. TD_IO may refer to the total number of cache I/O's in the data processing system.

If the determination at step 412 is that the number of separate occurrences of all of the above conditions is greater than or equal to a threshold value defined by TD_IO, the rule is triggered at step 414. The message template for the rule may then printed out along with information about the number of cache hits, cache reads, cache writes, cache available memory, pages free, desired available memory, and time as shown in display output 416 in FIG. 4B. The message template may indicate that a cache hit rate is low with a reasonably large attempt rate, and the free page list is relatively small, and there are zero pages of available cache memory. The suggestion in the message template may suggest that the cache hit rate could be improved by increasing the size of the cache if there is sufficient memory, as an example.

Figures 5A, 5B:
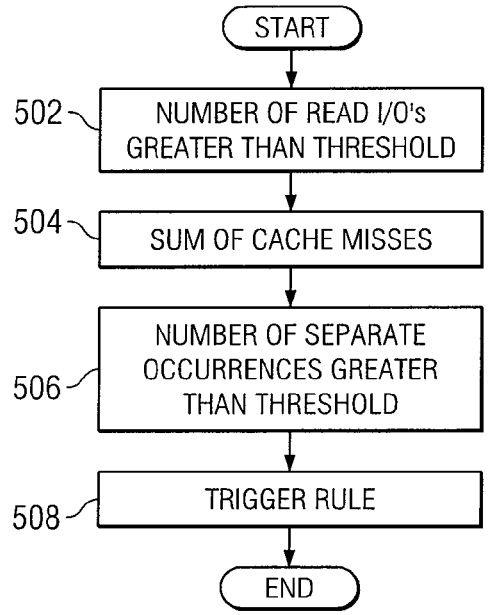
FIG. 5A is a flow diagram illustrating a method for managing performance data, according to an embodiment of the present invention.
FIG. 5B is an example of assorted performance data metrics that may be displayed for performance analysis, according to an embodiment of the present invention.

FIG. 5A is a flow diagram illustrating a method for managing performance data, according to an embodiment of the present invention. The analysis performed by the rule in FIG. 5A is designed to detect the situation where the cache attempts for a cache, such as cache 108, are greater than TD_XFC_ATTEMPT. TD_XFC_ATTEMPT may refer to a reasonably high number of cache attempts. The rule is also designed to detect cache misses for read I/O's with a request size greater than TD_CONTROLLER_CACHE_SIZE. TD_CONTROLLER_CACHE_SIZE may refer to a threshold that represents the max I/O size in blocks that the storage controller hardware will cache. A storage controller may refer to any suitable logic that provides the intelligence for the storage subsystem. I/O performance may be affected if both the cache and storage controller cache are bypassed.

The test for effective cache and storage controller cache usage begins at step 502 with a determination of whether the number of read I/O's is greater than the threshold defined by TD_XFC_ATTEMPT. If the file cache hit rate is too low, then step 504 is reached in which the sum of cache misses with a particular request size is examined. The particular request size may be examined in terms of disk blocks read in an I/O request. According to one embodiment of the invention, the threshold for a cache request size may be 1-32 disk blocks. According to one embodiment of the invention, the threshold for a cache request size may be 33-64 disk blocks. According to another embodiment of the invention, the threshold for a cache request size may be 65-127 disk blocks. According to yet another embodiment of the invention, the threshold for a cache request size may be 128-255 disk blocks. According to yet another embodiment of the invention, the thresholds for a cache request size may be greater than 255 disk blocks. However, the present disclosure contemplates many levels of cache request sizes. Various embodiments may include some, all, or none of the enumerated cache request sizes. If the sum of cache misses with a particular request size is greater than 20 percent of all cache misses, then step 506 is reached where the number of separate occurrences of all of the above conditions is examined to determine if they are greater than or equal to a threshold value defined by TD_IO.

If the determination at step 506 is that the number of separate occurrences of all of the above conditions is greater than or equal to a threshold value defined by TD_IO, the rule is triggered at step 508. The message template for the rule may then printed out along with information about the number of cache hits per second, cache reads per second, cache writes per second, cache misses based on request sizes, and time as shown in display output 510 in FIG. 5B. The message template may indicate the controller cache size request threshold is set to less than a particular request size. The message may further indicate that this threshold is used to approximate the size of a controller cache. The message may further indicate that I/O's that are larger than the controller cache have to go to disk. The suggestion in the message template may suggest default values for the threshold and how to go about setting the parameter for the controller cache size, as an example.

Figure 6A:
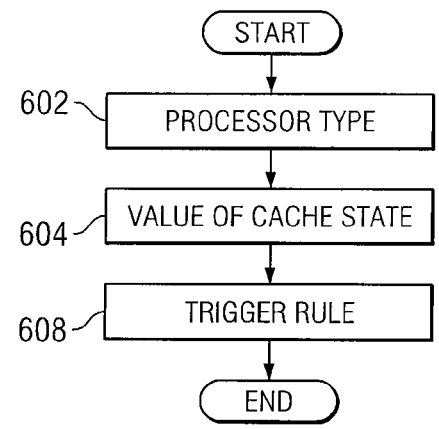
FIG. 6A is a flow diagram illustrating a method for managing performance data, according to an embodiment of the present invention.
Figure 6B:
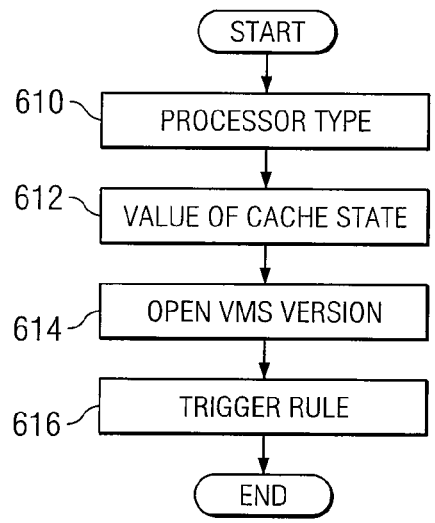
FIG. 6B is a flow diagram illustrating a method for managing performance data, according to an embodiment of the present invention.

FIGS. 6A and 6B are flow diagrams illustrating a method for managing performance data, according to an embodiment of the present invention. The analysis performed by the rule in FIG. 6A is designed to detect the situation on particular architecture processors such that a cache, such as cache 108, is completely disabled. The rule described in FIG. 6A is particularly adapted for the OpenVMS VAX family of operating systems for the VAX computer systems manufactured by Digital Equipment Corporation. The rule described in FIG. 6B is particularly adapted for the OpenVMS I64 family of operating systems for Hewlett Packard Integrity® servers. The test for effective cache usage begins at step 602 and 610 with a determination of the processor type. Next, the value of a CACHE_STATE value may be examined at steps 604 and 612 to determine whether the cache is disabled. CACHE_STATE may refer to any system value that indicates an operational state of a cache. If the cache is determined to be disabled on a OpenVMS VAX operating system, the rule is triggered at step 608. If the cache is determined to be disabled on an OpenVMS I64 or OpenVMS Alpha operating system, the version of the operating system may be examined at step 614. If it is determined that the version is greater than or equal to a particular version, the rule is triggered at step 616.

The message template may indicate the CACHE_STATE value as evidence for the rule firing. The message template may further indicate that the cache has been disabled. The suggestion in the message template may suggest procedures for enabling the cache, as an example.

According to various embodiments of the invention, many of the rules may include common characteristics. The triggering of a rule may involve determinations of relationships between thresholds, metrics, and parameters. The message template for a rule may not be printed out if the rule has not been triggered a sufficient number of times. This avoids false alarms since the system will not signal the presence of a problem if a rule triggered because of an anomaly. The thresholds may be adapted to fit different networks, different processors, and different operating systems. Additionally, the enumerated rules may contain various branches, and rules may be triggered after one, some, all, or none of the enumerated steps.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for managing performance data, comprising:
receiving, by a managing computer, a plurality of cache metrics for a client computer;
determining, by the managing computer, that a number of read input operations in the plurality of cache metrics is greater than a first threshold;
determining, by the managing computer, that a ratio of cache read hits to cache read input operations in the plurality of cache metrics is less than a second threshold;
in response to determining that cache memory for the client computer is limited based on the determined ratio being less than the second threshold, determining that total available memory for the client computer is greater than a third threshold, the third threshold indicative of a desired amount of available memory at the client computer;
displaying, by the managing computer, a message comprising a cache hit rate and an indication that the cache hit rate may be improved by increasing the cache memory with available memory.

2. The method of claim 1, further comprising:
determining, by the managing computer, one or more recommended values of one or more parameter adjustments; and
communicating, by the managing computer, the one or more recommended values of the one or more parameter adjustments to a user.

3. The method of claim 1, wherein the plurality of cache metrics include a total number of cache attempts metric and further comprising:
determining, by the managing computer, a cache hit rate percentage using the plurality of cache metrics.

4. The method of claim 1, wherein the plurality of cache metrics include an available cache memory metric and an available system memory metric, and further comprising:
determining, by the managing computer, a sufficient amount of available system memory using the plurality of cache metrics.

5. The method of claim 1, wherein the plurality of cache metrics include a cache misses metric and further comprising:
determining, by the managing computer, a plurality of cache misses with a particular request size using the plurality of cache metrics.

6. The method of claim 5, wherein the particular request size is between 33 and 64 disk blocks.

7. The method of claim 5, wherein the particular request size is between 65 and 127 disk blocks.

8. The method of claim 5, wherein the particular request size is between 128 and 255 disk blocks.

9. The method of claim 5, wherein the particular request size is greater than 255 disk blocks.

10. The method of claim 1, wherein the plurality of cache metrics include a cache operational metric and further comprising:
   determining, by the managing computer, whether a cache is enabled using the plurality of cache metrics.

11. The method of claim 1, further comprising determining, by the managing computer, whether one or more parameter adjustments are required.

12. A system for managing performance data, comprising:
   a processor;
   an interface operable to receive a plurality of cache metrics for a client computer; and
   a storage device embodying a program of instructions operable, when executed on the processor, to:
      determine that a number of read input operations in the plurality of cache metrics is greater than a first threshold;
      determine that a ratio of cache read hits to cache read input operations in the plurality of cache metrics is less than a second threshold;
      determine that cache memory for the client computer is limited based on the determined ratio being less than the second threshold, and in response, determine that total available memory for the client computer is greater than a third threshold, the third threshold indicative of a desired amount of available memory at the client computer;
      display a message comprising a cache hit rate and an indication that the cache hit rate may be improved by increasing the cache memory with available memory.

13. The system of claim 12, wherein the program of instructions is further operable to:
   determine one or more recommended values of one or more parameter adjustments; and
   communicate the one or more recommended values of the one or more parameter adjustments to a user.

14. The system of claim 12, wherein the program of instructions is further operable to determine whether one or more parameter adjustments are required.

15. Logic encoded in a non-transitory computer readable storage media, the logic being operable, when executed on a processor, to:
   receive a plurality of cache metrics for a client computer;
   determine that a number of read input operations in the plurality of cache metrics is greater than a first threshold;
   determine that a ratio of cache read hits to cache read input operations in the plurality of cache metrics is less than a second threshold;
   determine that cache memory for the client computer is limited based on the determined ratio being less than the second threshold, and in response, determine that total available memory for the client computer is greater than a third threshold, the third threshold indicative of a desired amount of available memory at the client computer;
   display a message comprising a cache hit rate and an indication that the cache hit rate may be improved by increasing the cache memory with available memory.

16. The logic of claim 15, wherein the logic is further operable to:
   determine one or more recommended values of one or more parameter adjustments; and
   communicate the one or more recommended values of the one or more parameter adjustments to a user.

17. The logic of claim 15, wherein the logic is further operable to determine whether one or more parameter adjustments are required.

* * * * *